Figure 7:
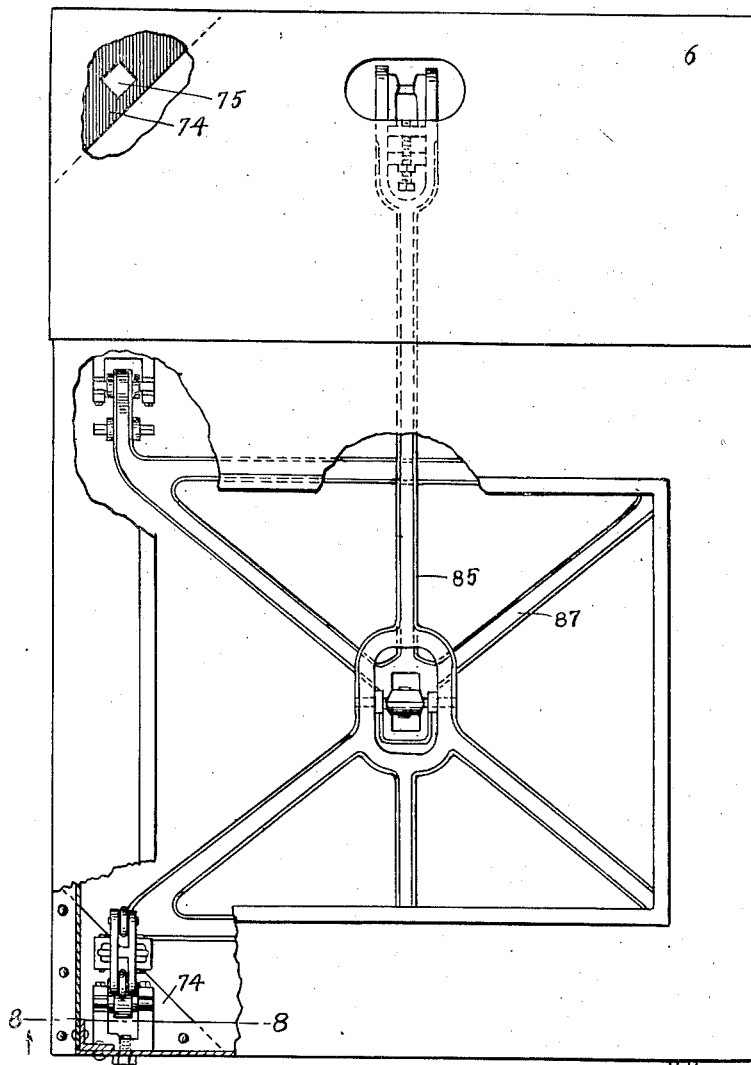

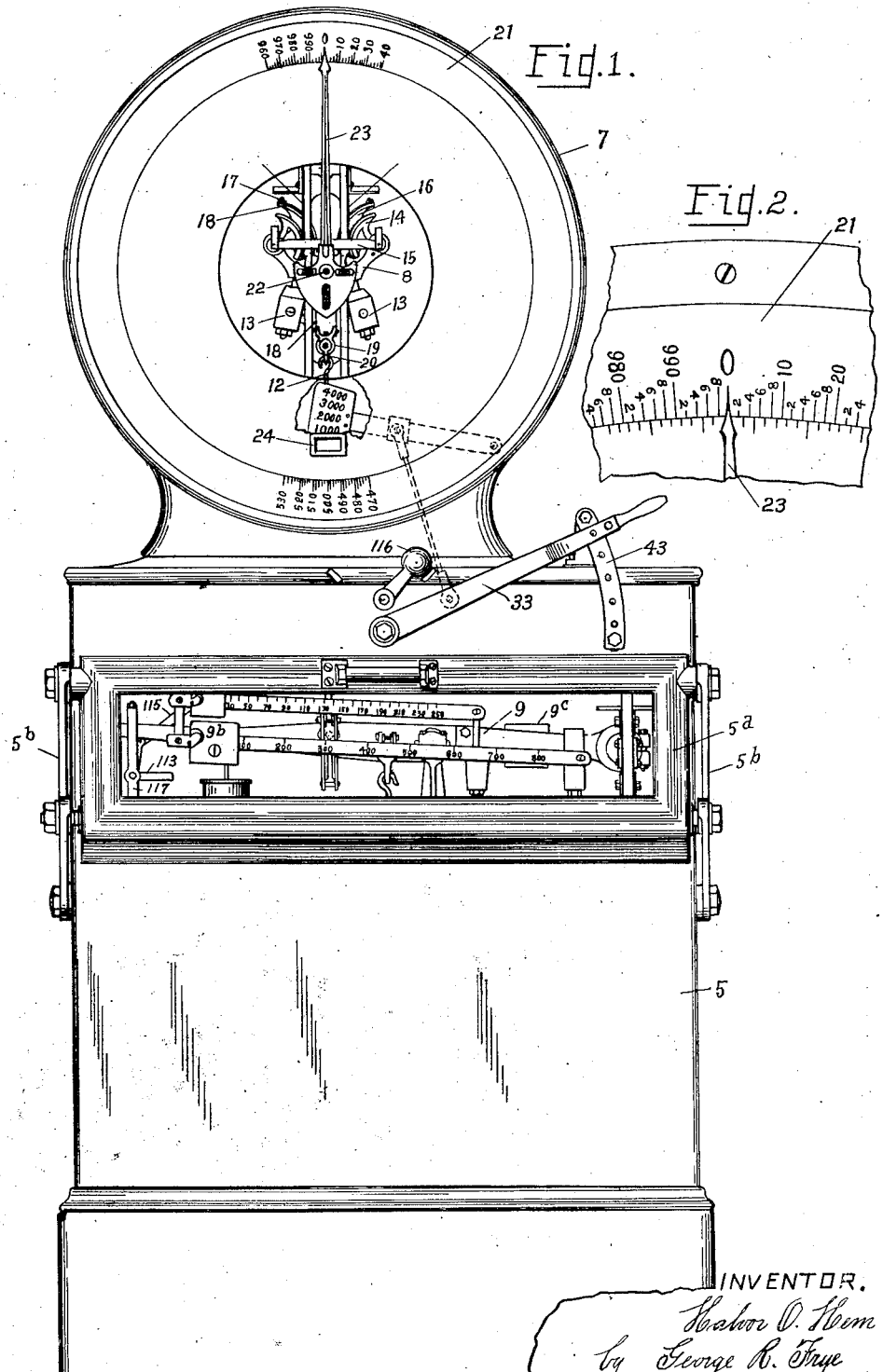

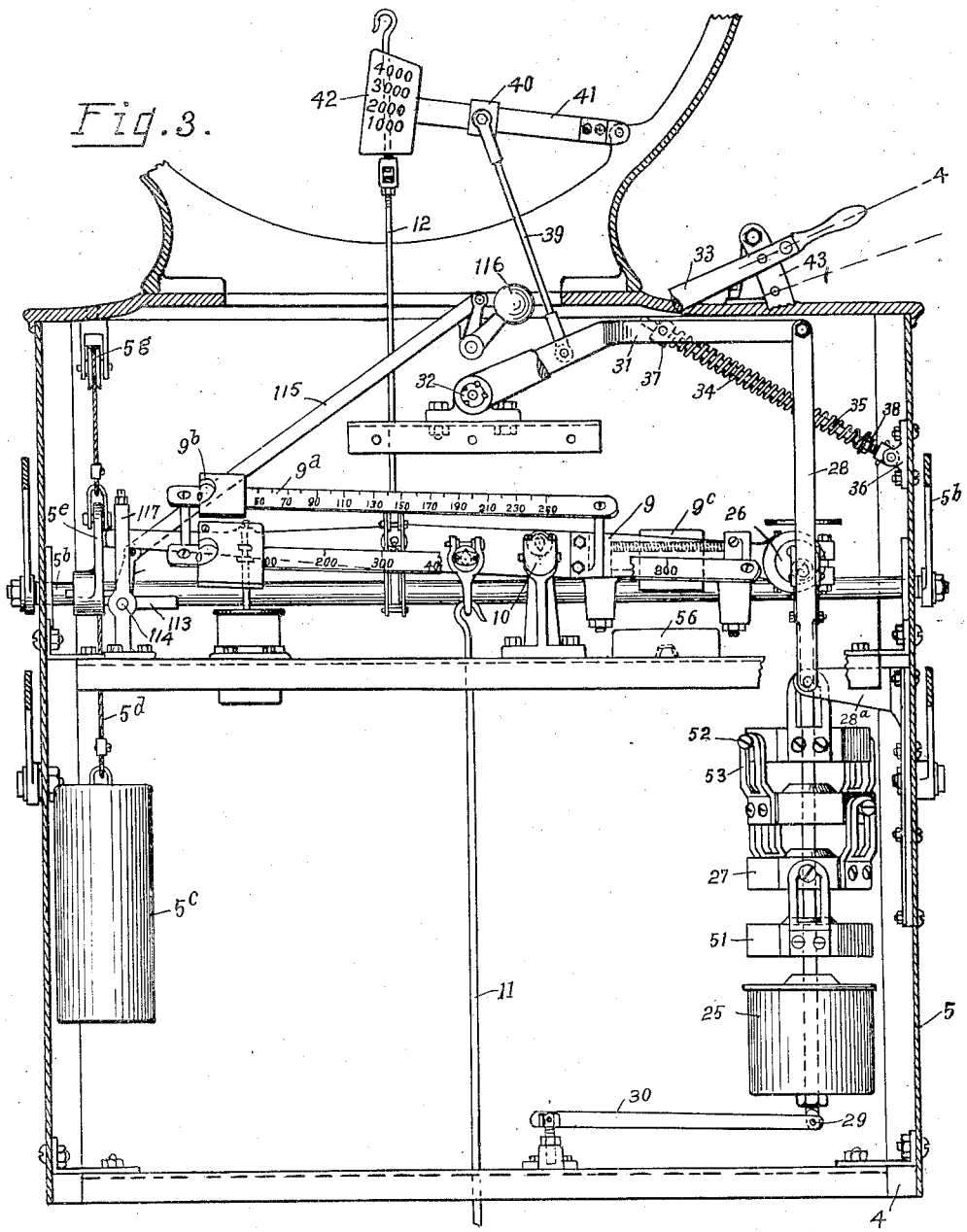

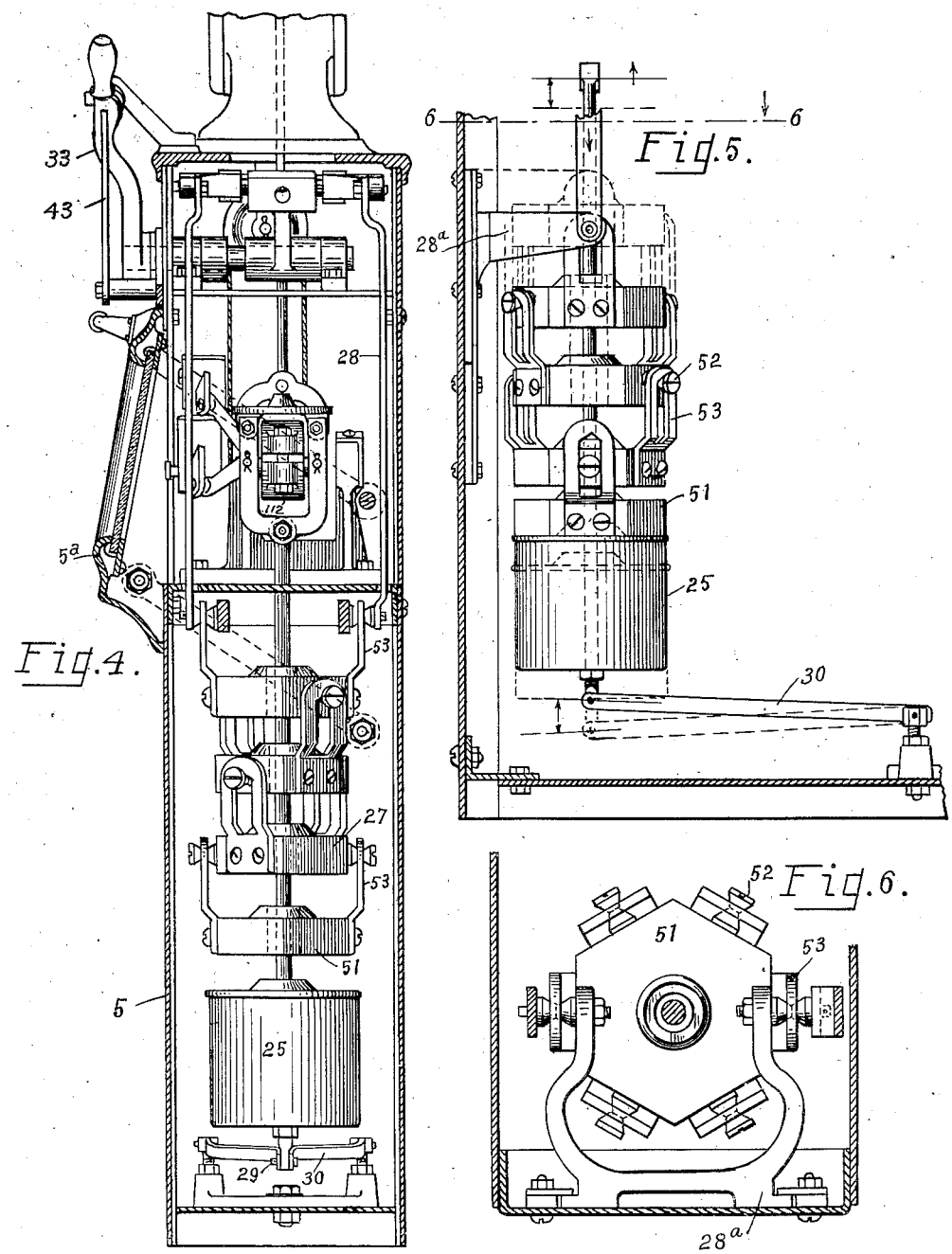

H. O. HEM.
WEIGHING SCALE.
APPLICATION FILED MAY 10, 1916.

1,423,660.

Patented July 25, 1922.
8 SHEETS—SHEET 4.

WITNESSES:
D. C. Walter

INVENTOR.
Halvor O. Hem
by George R. Frye
Attorney

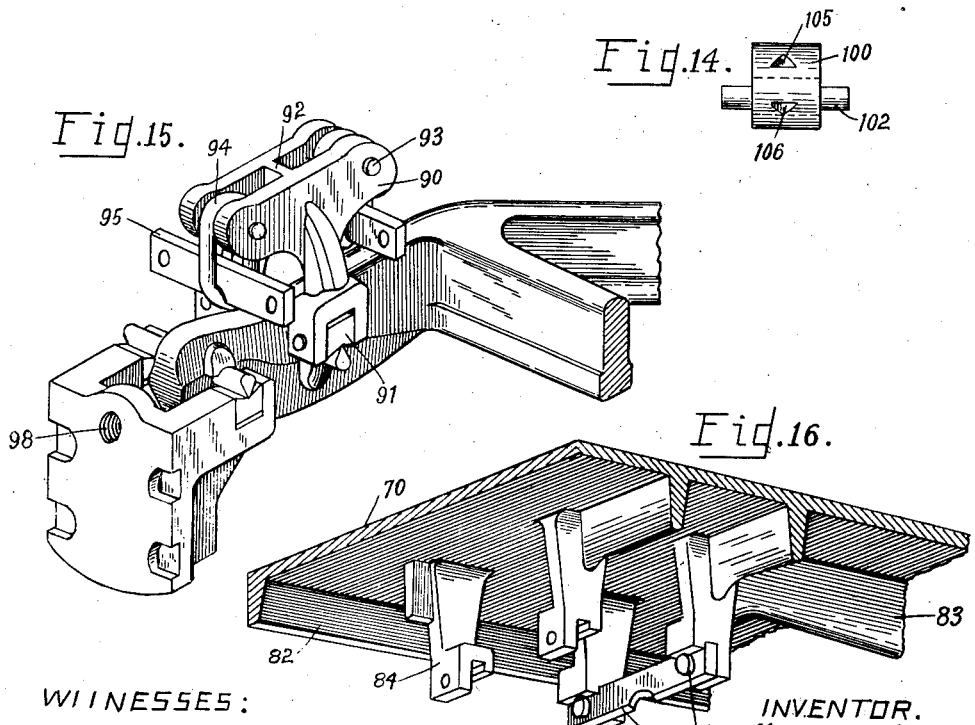

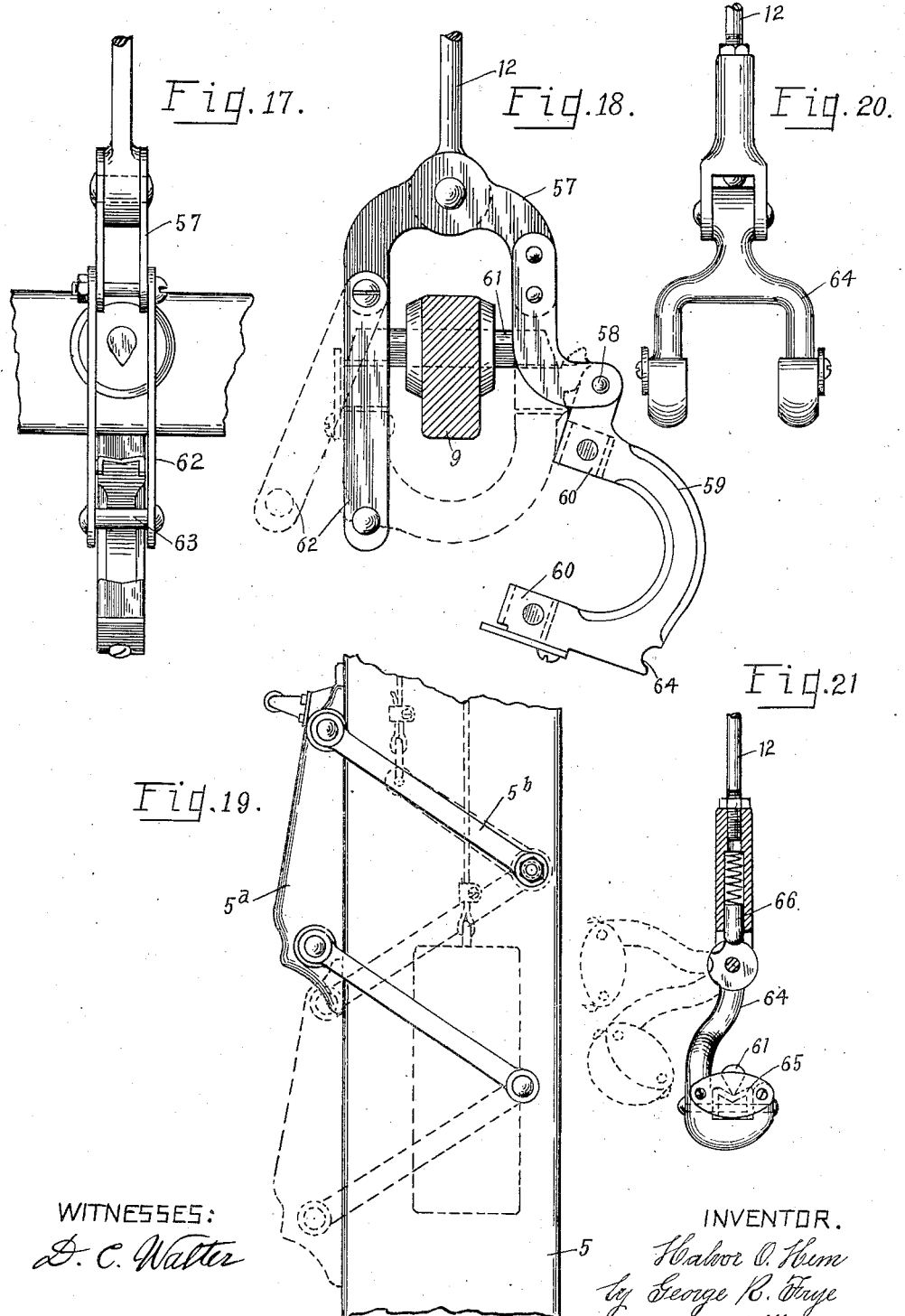

H. O. HEM.
WEIGHING SCALE.
APPLICATION FILED MAY 10, 1916.

1,423,660.

Patented July 25, 1922.
8 SHEETS—SHEET 7.

WITNESSES:
D. C. Walter

INVENTOR.
Halvor O. Hem
by George R. Frye
Attorney

H. O. HEM.
WEIGHING SCALE.
APPLICATION FILED MAY 10, 1916.
1,423,660.
Patented July 25, 1922.
8 SHEETS—SHEET 8.
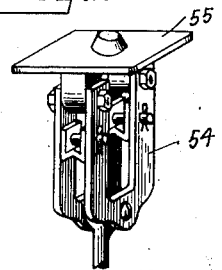
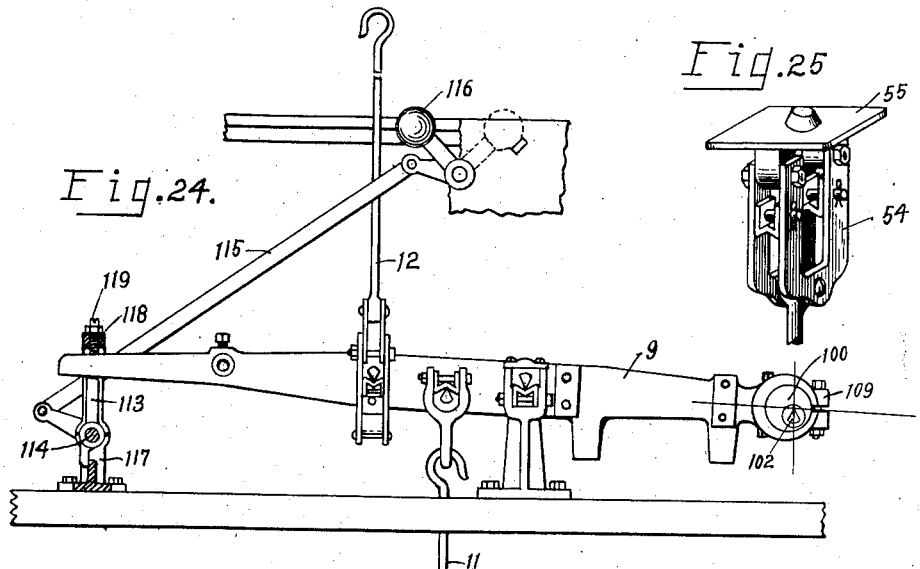
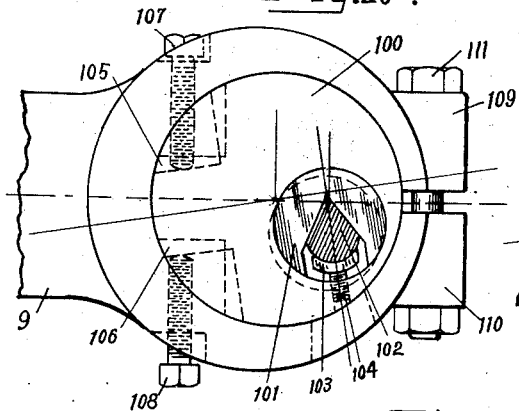
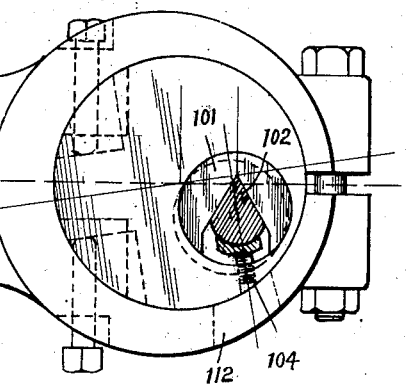
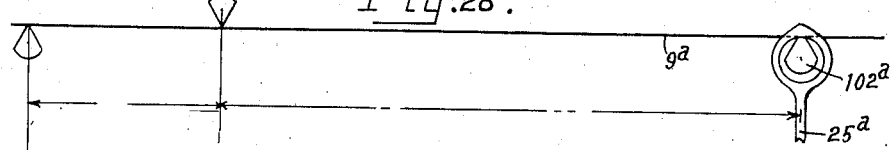
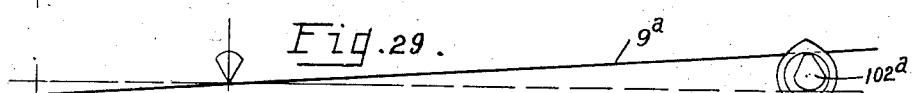
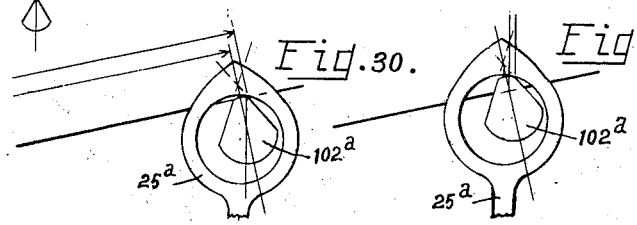
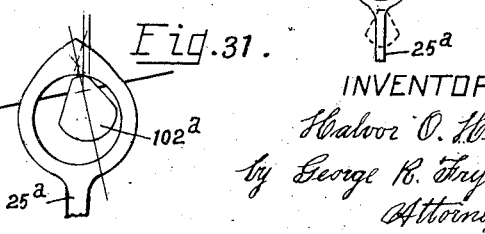
INVENTOR.
Halvor O. Hem
by George R. Frye
Attorney

UNITED STATES PATENT OFFICE.

HALVOR O. HEM. OF TOLEDO, OHIO. ASSIGNOR TO TOLEDO SCALE COMPANY, OF TOLEDO, OHIO, A CORPORATION OF NEW JERSEY.

WEIGHING SCALE.

1,423,660.  Specification of Letters Patent.  Patented July 25, 1922.

Application filed May 10, 1916. Serial No. 96,511.

*To all whom it may concern:*

Be it known that I, HALVOR O. HEM, a citizen of the United States, residing at Toledo, in the county of Lucas and State of Ohio, have invented certain new and useful Improvements in Weighing Scales, of which the following is a specification.

My invention relates to weighing scales designed to weigh comparatively heavy loads, and more particularly to the type of automatic or semi-automatic scales, though it will be understood that in many or all of its features the invention is applicable to other types of scales. In scales of the type herein illustrated it is desirable to provide a platform lever mechanism suitably connected with a scale beam arranged to carry one or more tare and capacity beams, and in addition to connect a pendulum counterbalance mechanism with the scale beam, so that both the pendulum counterbalance mechanism and the beam weighing mechanism will be operated from a single set of platform levers. A weighing machine of this kind, therefore, combines two systems of weighing operating in unison, the one system providing for the use of the pendulum counterbalance for offsetting the weight of articles within the capacity of this pendulum counterbalance, and the other system providing for movements of slidable counterpoises and for the use of detachable proportional weights to offset loads placed on the platform in the manner of that type of scales known as beam scales. When a load is placed upon the platform exceeding the capacity of the pendulum counterbalance, part of this load may be offset by the counterpoises carried by the beam, and the remainder by the pendulum counterbalance, the two systems operating in combination to form an automatic or semi-automatic scale. In my improved scale, means are also provided for readily disconnecting the pendulum counterbalance mechanism from the scale beam, enabling the use of the beam weighing mechanism independently of the pendulum mechanism, if desired.

This invention particularly has in view the provision of improved means for constructing, arranging and combining various elements of the scale mechanism, as, for example, the provision of improved means for suspending the detachable counterpoise weights and for depositing them successively upon the scale beam, the prevention of excessive vibration of the suspended weights and of the scale beam, the adaptation of an improved scale beam with longitudinally and vertically adjustable pivots in a combined scale of this type, and the provision of suspension bearings or supports for the platform on the lever mechanism adapted to protect the knife-edge pivots of the lever.

Other objects and features of the invention will appear from the following description and claims, in which reference is had to the accompanying drawings illustrating preferred embodiments of my invention and wherein similar reference numerals designate similar parts throughout the several views.

In the drawings:—

Figure 9:
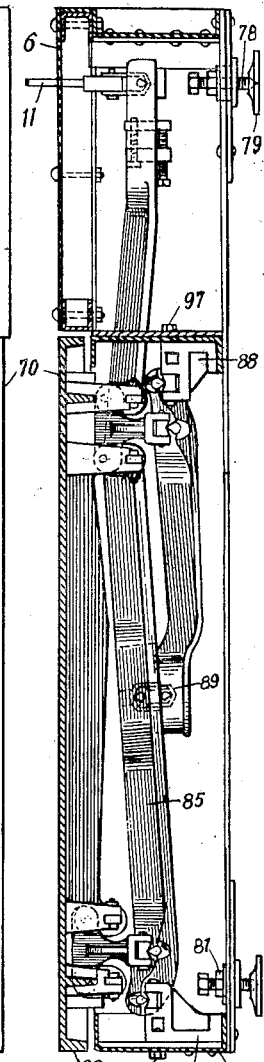
Figure 8:
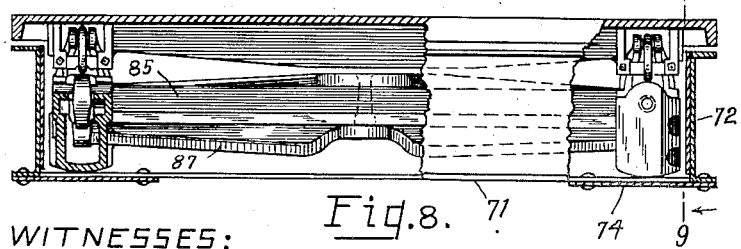
Figure 10:
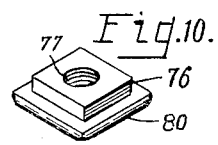
Figure 22:
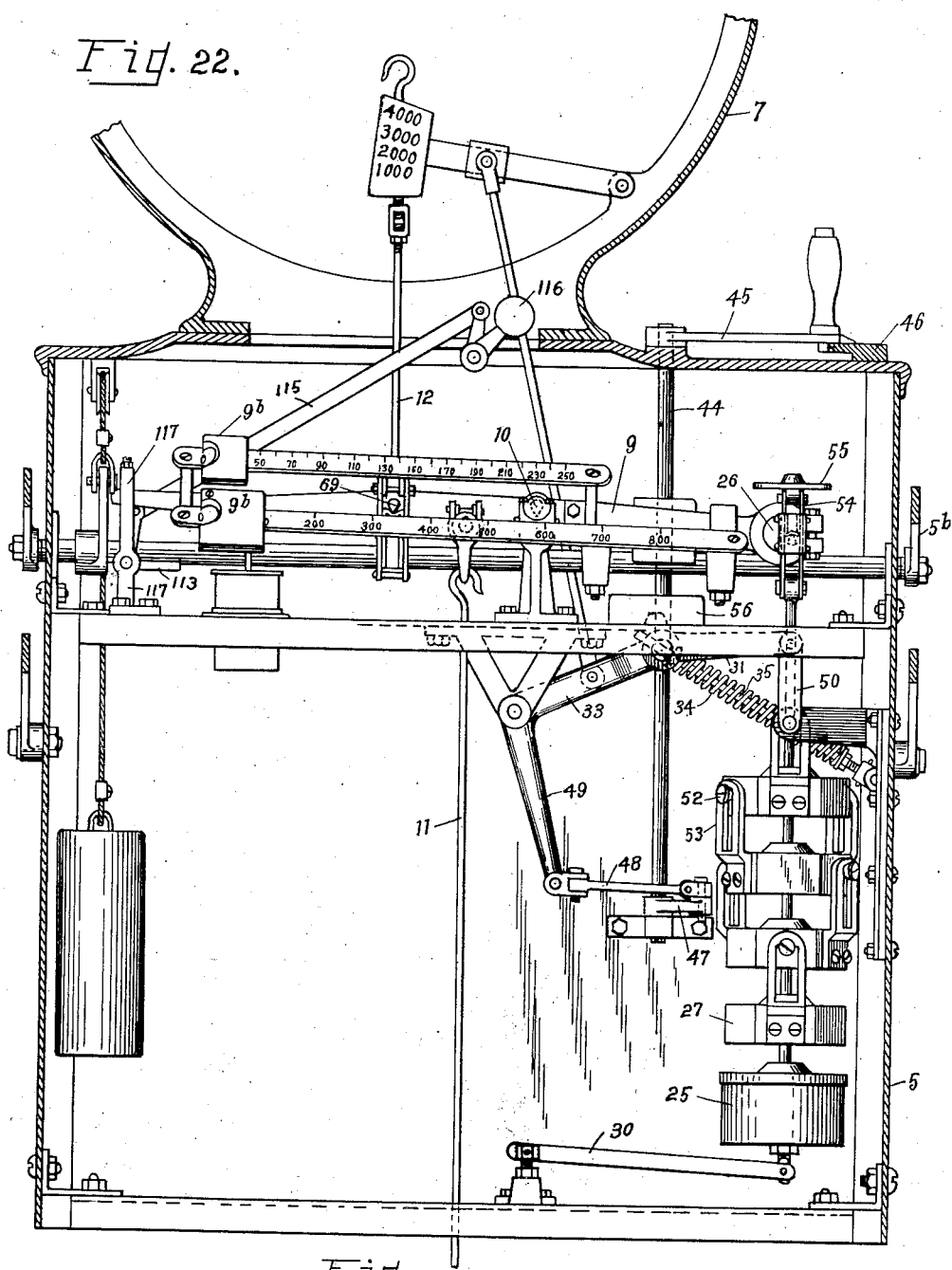
Figure 23:
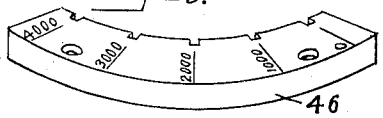

Fig. 1 is a front elevation, with parts broken away, of the weighing mechanism of the scale; Fig. 2 is an enlarged detail view of one form of dial; Fig. 3 is an enlarged front elevation of the weighing mechanism of the scale, with the scale at its zero or normal position; Fig. 4 is a transverse sectional view taken substantially along the line 4—4 of Fig. 3; Fig. 5 is an enlarged detail elevation of the detachable counterpoise weights and suspending mechanism; Fig. 6 is a sectional view taken substantially on the line 6—6 of Fig. 5; Fig. 7 is a plan view, with parts broken away, of the platform mechanism of the scale; Fig. 8 is a transverse sectional view on the line 8—8 of Fig. 7; Fig. 9 is a longitudinal sectional view along the line 9—9 of Fig. 8; Fig. 10 is a detail perspective view of a portion of the leveling mechanism; Figs. 11, 12, 13 and 14 are detail views of the scale beam showing the means for longitudinally and vertically adjusting the pivot; Fig. 15 is a detail perspective view of a portion of a platform lever and its associated bearings; Fig. 16 is a detail perspective view of a portion of the scale platform; Figs. 17 and 18 are detail views of the means for connecting and disconnecting the scale beam with the pendulum counterbalance; Fig. 19 is a side elevation of a portion of the scale casing and illustrating the extreme positions of the door; Figs. 20 and 21 are detail views of a modified form of means for connecting and disconnecting the scale beam and pendulum counterbalance; Fig. 22 is an enlarged sectional view, similar to Fig. 3, of the scale utilizing modified forms of certain elements; Fig. 23 is a detail perspective view of the index plate associated with the weight depositing mechanism; Fig. 24 is a detail view of the mechanism for relieving the scale beam and pendulums from shock due to impact on the platform; Fig. 25 is a detail perspective view of the upper portion of the detachable weight-receiving counterpoise; Figs. 26 and 27 are enlarged detail views showing my improved means for shifting positions of pivots; and Figs. 28–31 are diagrammatic views showing the necessity for and manner of moving pivots to correct error due to wearing of the pivots.

I will first describe the form of the invention shown best in Figs. 1 and 3, it being understood that the form shown in Fig. 22 is identical therewith except in respect to details to be hereinafter pointed out. As usual in scales of this character, the casing 5 of my scale is secured upon the base 6 (see Fig. 7) adjacent one end thereof, and supports at its upper extremity a housing 7 adapted to contain a pendulum counterbalance mechanism 8. The scale beam 9 is fulcrumed, as at 10, within the casing 5, and is suitably connected, as by the steelyard rod 11, with the platform-supporting lever mechanism, and by the adjustable hook rod 12 with the pendulum counterbalance mechanism 8. It is to be understood that any suitable pendulum counterbalance mechanism may be employed in the construction of the scale, this mechanism forming no part of the present invention. The pendulum counterbalance herein illustrated (Fig. 1) is one that has been found to successfully demonstrate the capabilities of this invention, and shows a double pendulum scale of a well-known type adapted to be suitably connected with the scale beam 9 through the medium of the adjustable hook rod 12 and so arranged and positioned that upon the placing of a load upon the scale platform the pendulums will be swung upwardly into a position counterbalancing the weight of the load on the platform. Inasmuch as the present invention is not dependent for its operation upon any particular form of pendulum scale mechanism, no attempt is made in this application to show a complete scale mechanism, nor to delineate the action of the scale in its load counterbalancing or weighing operations, only so much of the pendulum counterbalance mechanism being shown as is necessary to clearly portray the operation and coaction of the remaining scale mechanism herein disclosed.

As herein shown, the pendulum counterbalance mechanism comprises a pair of oppositely-disposed pendulums 13, each of which comprises supporting segments 14 secured on transverse shafts, and the two shafts are connected together by crossbars 15, the segments 14 being suspended upon the lower ends of flexible supporting ribbons secured at their opposite ends upon the framework of the scale. Intermediate the supporting segments of each pendulum is a somewhat larger segment 16, which is also fixed to the transverse shaft, said segment extending at its periphery between the pillars of the framework supporting the segments 14 and is connected at its upper end, as at 17, to a flexible metallic ribbon 18, which extends over the arcuate face of the segment and is attached at its lower end to an equalizer bar 19. The construction of the two pendulums is substantially identical, and the ribbons 18, as shown in Fig. 1, are connected to opposite sides of the equalizer bar 19, which is pivotally connected, as by the link 20, with the upper end of the hook rod 12, which, as before described, is connected with the scale beam 9. In the operation of the scale, when a load is placed on the scale platform, a downward pull is exerted upon the equalizer bar 19, which is transmitted through the ribbons 18 to the larger segments 16, causing the swinging of the pendulums so that the pendulum weights are raised to a counterbalancing position. During the swinging movement of the pendulums to offset the weight of the load, the crossbars 15 are moved vertically upward, and through the medium of this vertical movement of the crossbars the weight indication on the dial 21 is effected, the crossbars 15 carrying a vertically-disposed rack meshing with a pinion (not shown) fixed upon the indicator shaft 22 carrying the index hand 23. The indicator shaft 22 is mounted concentrically of the dial 21 having the desired weight graduations suitably inscribed thereof, as for example, in the manner illustrated in Figs. 1 and 2, with which graduations the index hand 23 co-operates in indicating the weight of the load being weighed. This pendulum counterbalance mechanism is sufficient to independently offset the weight of all loads within the capacity shown on the dial. When loads are placed on the scale platform exceeding the capacity of the dial, the additional weight may be counterbalanced by the detachable poise weights adapted to coact with the scale beam 9, in the manner presently to be described, and a target indication 24 may be arranged adjacent the dial indications, as shown in Fig. 1, to indicate the weight counterbalanced by the detachable poise weights.

The scale beam 9 carries a hanging counterpoise receiving member 25 suitably suspended from the beam pivot 26, which hanging counterpoise is formed with sufficient weight to assist in the floating of the platform and lever mechanism in the usual manner, and is adapted and arranged to serially receive the detachable weights 27 normally suspended by links 28 from a suitable lever 31 above the pan of the hanging counterpoise 25. To prevent undue oscillation of the hanging counterpoise member 25, the lower end of said member is pivotally connected, as at 29, with a check link mechanism 30, the other end of which is pivotally connected upon an adjustable post positioned in vertical alignment with the fulcrum member 10 of the scale beam 9, and the links 28 suspending the detachable weights 27 are connected with a guide frame 28ᵃ mounted for vertical slidable movement on the housing 5. The lever 31 is secured at its opposite ends to the links 28 and the shaft 32 carrying the hand lever 33 (see Figs. 1 and 3), the arrangement being such that upon swinging the hand lever 33 downwardly from the position shown in Fig. 1, the lever 31 and links 28 will be lowered to successively deposit the detachable weights 27 upon the pan of the hanging counterpoise 25. The lever 31, and consequently the links 28 and detachable weights 27, are normally maintained in their elevated positions by means of the coil spring 34 encircling the rod 35 which is pivoted at one end upon a bracket 36 carried upon the casing of the scale and has its opposite end freely movable in the cross-arm 37 pivotally secured in the lever 31. One end of the spring 34 bears against the cross-arm 37 and the opposite end thereof bears against an adjusting member 38 threaded upon the rod 35. It is to be noted that the spring 34 is compressed to a less degree at its uppermost or normal position, as shown in Fig. 3, and that as the lever 31 is lowered, the spring 34 is placed under additional compression so as to assist in returning the lever 31 and the suspended weights 27 to their elevated positions when desired. The arrangement of the spring, rod 35 and pivoted cross-arm 37 is such that as the spring is compressed, the rod 35 approaches more nearly a straight line position with the shaft 32, thus bringing the cross-arm 37 gradually into alignment with the pivotal points of the lever 31 and rod 35, allowing the compression of the spring 34 while reducing the angular pressure exerted on the lever 31 as the weights 27 are deposited. A link 39 is pivotally connected at its lower end with the lever 31 and at its upper end with a sleeve 40 adjustably secured upon the pivoted arm 41 carrying the indicating table 42 bearing the several weight indications corresponding to the counterbalancing capacities of the several detachable weights 27. By sliding the sleeve 40 along the arm 41 and securing it in any desired position, provision is made for the allowance of the necessary rocking movement of the supporting lever 31 to successively deposit the weights 27 upon the counterpoise pan and to move the indicating table 42 sufficiently to bring the correct indication directly in line with the target opening 24. A guide plate or segment 43 is preferably apertured, as shown in Fig. 1, to provide guiding means for the stopping of the hand lever 33 at the desired position to allow the detachable weights 27 to successively rest on the counter-poise, a pin or other centering means carried by the hand lever being designed to fit within the apertures in the guide plate, as desired.

The embodiment illustrated in Fig. 22 discloses a modified form of weight depositing means and comprises a vertical shaft 44 mounted within the casing 5 and carrying at its upper end a crank 45 adapted to be moved over a notched guide plate 46, as desired, (see Fig. 23). Adjacent its lower end the shaft 44 carries an arm 47 pivotally connected with one end of the link 48, the other end of which is pivoted to the lower arm of the bell-crank-lever 49, the upper arm of which is bifurcated at its free end and carries the links 50 from which is supported the slidable guide frame 50ᵃ and the several detachable weights 27. The spring mechanism for normally maintaining the weights and lever in elevated position, and the means for connecting the lever with the weight indicating table may be identical with that hereinbefore described, in connection with the embodiment illustrated in Figs. 1 and 3.

Each of the weights 27 comprises a body portion 51 preferably polygonal in shape having raised cone centering means on its upper surface and a correspondingly shaped recess in its lower portion. Spool-shaped supporting arms 52 (see Figs. 5 and 6) and slotted suspension lugs 53 are secured diametrically opposite each other on the sides of each weight, and the slotted lugs 53 of the lowermost weight 27 normally rest upon and are suspended from the supporting arms 52 of the weight immediately above, which weight is similarly suspended from the next adjacent weight, and so on, the uppermost weight being directly suspended from the slidable guide frame 28ᵃ and the links 28. The hanging counterpoise 25 is suspended from the pivot 26 of the scale beam 9 by means of a stirrup or clevis 54 (Fig. 25) carrying bearings adapted to rest upon the knife-edge of said pivot, and a table or upper pan 55 is supported by said clevis above the scale beam to receive a detachable loose weight which may be used in addition to the series of suspended weights 27. This extra detachable weight is shown at 56 in Figs. 3 and 22 of the drawings as normally carried upon a frame within the casing 5 in convenient position for the operator to transfer the weight from its normal resting place into position on the upper pan 55. This weight may be employed to augment the weighing capacity of the scale by being utilized in addition to the series of suspended weights 27 while the beam weighing mechanism and the counterbalance mechanism are conjointly used. However, the main function of this weight 56 and the upper supporting table 55 is to provide a readily accessible means for taking up the initial pull of the platform levers by the beam weighing mechanism whenever the pendulum counterbalance mechanism is detached therefrom. Thus the initial pull ordinarily taken up by the pendulum counterbalance mechanism when connected with the scale beam 9 would be taken up by the scale beam through the addition of the weight 56 when placed upon the upper table 55 if the pendulum counterbalance mechanism is detached from the scale beam, the weight 56 being sufficiently heavy to counterbalance the predetermined pull required.

One form of means which may be utilized to readily disconnect the pendulum counterbalance mechanism from the scale beam 9 is shown in Figs. 17 and 18. The lower extremity of the hook rod 12 is connected with an inverted U-shaped link 57, to one leg of which is pivotally connected, as at 58, a U-shaped member 59 carrying a pair of bearings 60 in position to contact the knife-edges 61 of the scale beam 9 when the member 59 is held in its normal position (shown in dotted lines in Fig. 18). The member 59 is locked in normal or operative position by means of a swinging link 62 pivoted at its upper end to the opposite arm of the link 57, and carries a transverse bar 63 adapted to fit into a recess 64 in the lower face of the bracket 59. To disconnect the pendulum counterbalance from the beam 9, the link 62 is swung out of engagement with the bracket 59, allowing said bracket to fall into the position shown in full lines in Fig. 18.

A modified form of disconnecting means is shown in Figs. 20 and 21, and comprises a bifurcated hook 64 pivotally connected at its upper extremity to the lower end of the hook rod 12. A bearing 65 is suitably secured in each of the bifurcated arms and positioned to contact with the knife-edge pivot 61 of the scale beam when in its operative position, as indicated in full lines in Fig. 21. A spring-pressed plunger 66 may be utilized to yieldingly lock the hook 64 in adjusted position. To disconnect the pendulum counterbalance from the scale beam, the scale beam is raised slightly to lift the pivot from the bearings 65, and the hook 64 is then swung on its pivot into a position such as is shown in dotted lines in Fig. 21.

The base 6 of the scale (Figs. 7, 8 and 9) contains, as usual, a leverage system for supporting the load-receiving platform 70, modified, however, to accommodate itself or be adapted to my invention. The base consists of a floor 71, sides 72 and end pieces 73 formed of sheet metal or other suitable material bent into desired shapes and sizes and strengthened at the corners and elsewhere as desired with suitable angle irons and braces. Triangular brace plates 74 (see Figs. 7 and 8) are secured below the floor 71 at each corner of the base, and are formed with suitable openings 75 of angular contour for the reception of correspondingly shaped insets 76 (see Fig. 10) having threaded openings 77 therein cooperating with the threaded shank 78 of the adjusting feet 79. The adjusting feet 79 are provided with a polygonal head on their upper ends and socket members on their lower extremities fitting into recesses in enlarged foot-plates (see Fig. 9). The inset 76 is formed with a shoulder 80 adapted to contact with the base of the plate 74, and a locking nut 81 threaded upon the threaded shank 78 co-operates with the inset 76 to hold the feet 79 in any adjusted position. The platform 70 is formed with down-turned edges 82 and strengthening ribs 83 (see Fig. 16), the ribs 83 serving to brace both the platform 70 and the legs 84 securing the platform to the lever bearings.

The platform-supporting leverage system comprises two levers of the second order, a main lever 85 fulcrumed upon bearings 86 at the front of the base 6 and carrying at its rear extremity an adjustable nose iron connecting through the steel-yard rod 11 with the scale beam 9, and a second lever 87 fulcrumed at one end upon brackets 88 carried by the base adjacent the rear end of the platform 70 and connected at its other end to the main lever 85 by means of a central link 89. On these two levers the platform is supported, as usual, though the particular means of support is novel. The levers 85 and 87 are provided adjacent each corner of the platform with knife-edge pivots extending transversely through and on each side of the levers. The compensating bearings 86 and 88 upon which these levers are fulcrumed are formed with side arms carrying compensating V-bearings of hardened steel or agate in position to receive the laterally-extending knife-edge pivots of the levers.

Adjacent each of these fulcrum pivots the levers carry upwardly-pointed knife-edge pivots adapted to support the platform 70 through the medium of novel rocker bearings constructed and arranged so as to absorb and dissipate all lateral or swinging movement of the platform 70 without transmission of any rocking or oscillating movement of the bearings to the pivots to the detriment of the knife-edges thereof. Each of these rocker bearings (see Fig. 15) comprises a pair of T-shaped side members 90 having bifurcations at their lower extremities in which are pivoted inverted compensating V-bearings 91 of hardened steel, agate, etc., these T-shaped members being laterally spaced from one another by means of a central strengthening rib 92. The opposite ends of the upper or cross members are joined by lateral journals 93 upon which are loosely supported links 94, the lower extremities of which provide fulcrums for apertured cross-bars 95 directly supporting the legs 84 carried by the platform 70. The legs 84 are likewise apertured, and suitable bolts or rivets 96 may be extended through the aligned apertures in the legs and cross-bars 95 to secure the platform 70 rigidly to the rocker bearings. The interposition of rocker bearings constructed as above described between the platform 70 and the supporting levers allows for swinging and lateral movements of the platform 70 without the bearings 91 rocking on the pivots, which would dull or otherwise impair the knife-edges of the pivots, the crossbars 95 which are directly secured to the platform 70 being capable of rocking on the lower extremities of the links 94 to accommodate swing or shaking platform movements, and the links 94 being capable of swinging movements longitudinally and laterally on the journals 93 connecting the T-shaped members of the bearings, so as to take up lateral and longitudinal movements of the platform without transmitting such movements to the T-shaped members. Further, the pivotal mounting of the bearings 91 in the T-shaped members allows the bearing to have a uniform contact with the pivots so as to reduce to a minimum the dulling of the pivot edges.

The brackets 86 and 88 carrying the bearings upon which the platform levers are fulcrumed rest upon the floor 71 of the base 6 and are loosely secured to the side walls of the base by bolts 97 extending through apertures in the base and fitting into threaded apertures 98 in the brackets (see Figs. 9 and 15). These brackets are also preferably formed with their lower extremities rounded on an arc having the bolt 97 as a center, the rounded extremities resting upon the base 6 so as to permit slight compensating or rocking movement of the bracket so the pivots will have uniform bearing on each side of the lever.

The pivots of the scale beam 9 (Fig. 24) may be mounted so as to permit of longitudinal and vertical adjustment to correct for inaccuracies due to wear or accidental displacements occasioned through usage or mishandling. As herein illustrated, only one of the beam pivots is shown as provided with my improved adjustable mounting, but it is to be understood that this adjustable mounting may be utilized in any or all of the pivots of the beam 9 or other levers where desired. This adjustable mounting comprises a large cylindrical member or disk 100 (Fig. 26) transversely extending through the beam 9 and having an eccentrically-placed circular opening therethrough for the reception of a smaller cylindrical member or disk 101 having a cut-out therein shaped to receive the knife-edge pivot 102, a backing member 103 and an adjustable securing member 104 threaded into a suitable aperture in the larger disk 100 being utilized to hold the pivot in adjusted position (see Figs. 26 and 27). The disk 100 is provided with notches 105 and 106 against which bear adjusting screws 107 and 108 respectively, said adjustable members being shown as threaded through suitable apertures in the scale beam 9 and oppositely-arranged so as to firmly hold the disk 100 in its adjusted position. The scale beam 9 may also be formed as a split ring having threaded jaws 109 and 110 for the reception of a clamping bolt 111 adapted to assist in locking the disk 100 and the pivot in desired position. An elongated slot 112 is also formed in the lower half of the split ring to allow for conveniently turning the adjustable securing member 104.

In the assembling of the scale, the pivot 102 is secured in position in the disk 101 with the knife-edge in vertical alignment with the center of the adjusting member 102, and the large disk 100 is rotated in the scale beam 9 so as to bring the knife-edge of the pivot 102 into alignment with the knife-edges of the other pivots of the scale beam and is locked in such position by the adjusting screws 107 and 108 and the clamping screw 111. It is, therefore, apparent that this adjustable mounting allows for ready shifting of the pivot to secure the desired alignment. Should, however, the knife-edge of the pivot 102 become dulled or worn, or for any reason it becomes desirable to re-adjust the pivots of the beam 9 to bring them again into alignment, the clamping screw 111 and either the adjustable screw 107 or 108 are loosened, according to the direction of movement necessary to re-locate the pivot. The other adjusting screw is then rotated to force the large disk 100 to the new position desired, either elevating or lowering the pivot as desired, the pivot being raised above the center line in the example shown in Figs. 26 and 27 in the drawings. Since, however, the rotative movement of the disk 100 carries the point of the pivot 102 away from the vertical plane of its former position, it is necessary to correct for this rotative movement by returning the point of the pivot to the original plane, if the pivot distances of the beam are to remain the same. This is done by rotating the smaller disk 101 in the opposite direction to return the pivot to its original plane. In Figs. 26 and 27 this adjustment is graphically shown, the dotted line circles illustrating the original position of the smaller disk 101 prior to the turning of the larger disk 100 to effect the raising of the pivot above its former horizontal plane. In Fig. 26 the full line position of the smaller disk 101 and the pivot 102 shows the position of these elements before correction is made to bring the point of the pivot back to its original vertical plane, and the full line positions in Fig. 27 show the corrected positions of the smaller disk 101 and the pivot 102 after the smaller disk has been rotated to effect such correction.

In Figs. 28–31 the method of re-aligning the pivots by raising the same after they have become dulled is diagrammatically shown. Supposing the pivot 102$^a$ has become dulled, as shown, and the three pivots of the scale beam 9$^a$ were in alignment when the beam itself was absolutely horizontal, the pivot distances of the beam would then be correct in this horizontal position since the counterpoise member 25$^a$ would contact the pivot 102$^a$ at approximately the correct vertical plane. When the beam tilts, however, the counterpoise member 25$^a$ would rock upon the rounded pivot 102$^a$ (see Figs. 29–31) so that the pivot distance between the central beam pivot and the pivot 102$^a$ would increase in length as the beam moves in one direction, and decrease as it moves in the other, giving constantly changing pivot distances and accordingly inaccuracies in weighing. Fig. 30 graphically shows the increase in pivot distance as the hanging counterpoise 25$^a$ rocks on the pivot as this end of the beam is elevated. To overcome these inaccuracies and keep the effective pivot distances uniform despite the rocking of the beam on the pivot 102$^a$, the pivot 102$^a$ may be elevated to substantially the position shown in Fig. 31, wherein the rounded or dulled edge of the pivot is placed above its former horizontal plane a distance sufficient to permit the vertical line of pull of the counterpoise 25$^a$ as the counterpoise rocks on the pivot to always pass through the point of intersection of the center line of the pivot with the original horizontal plane. Accordingly, the effective pivot distance can always be measured from, and the line of pull will always act through, the same point on the horizontal plane in alignment with the other pivots of the beam.

In order to save the knife-edges, pendulum mechanism, and other delicate parts of the scale from injury and unnecessary wear during the placing of load upon the scale, it is desirable that the scale beam 9 be braced or locked to prevent the transmission of shocks thereto, and further, that the locking device can be used without opening the door of the housing. This desideratum may be secured by providing a crank arm 113 on a rock shaft 114 journalled below the scale beam (see Fig. 24) and by providing means such as the link 115 and hand lever 116 for rotating said rock shaft to bring the crank arm into engagement with the lower surface of the beam 9. As herein shown, the rock shaft 114 is journalled in a bracket 117 provided with an upper cross-arm 118 carrying an adjustable post 119 against which the upper face of the beam 9 may be forced by the crank arm, thus effectively securing the beam between said post and arm. Suitable means may be provided for limiting the movement of the crank arm.

The scale beam 9 may carry one or more graduated tare or capacity beams 9$^a$ provided with slidable poises 9$^b$ in the customary manner. Suitable adjustable sealing weights, as 9$^c$, may also be provided for accurately balancing the scale beam. Ready access to the slidable poises of the tare or capacity beams 9$^a$ may be had through an opening in the front of the casing 5, this opening being normally covered by a door 5$^a$ connected with the casing 5 by means of parallel links 5$^b$ pivoted to the door and casing respectively. The parallel links 5$^b$ are preferably arranged on opposite sides of the casing 5, as shown in Figs. 3 and 19, and are so connected with the upper and lower portions of the door and the casing 5 that the door will lie closely against the forward portion of the casing in both of its extreme positions, the extreme open position being shown in dotted lines in Fig. 19. To facilitate the opening and closing of the door 5$^a$, a counterbalance weight 5$^c$ is connected by means of a flexible cable 5$^d$ with a crank 5$^e$ carried by the cross-shaft 5$^f$ connecting the uppermost of the parallel arms 5$^b$, the flexible cable passing over suitable pulleys 5$^g$ mounted in the casing.

The operation of the scale is believed to be apparent from the foregoing description. A load being placed upon the platform 70 will depress the scale beam 9 through the medium of the platform-supporting levers 85 and 87 and the steelyard rod 11, the depression of the scale beam 9 serving to elevate the pendulums 13 of the pendulum counterbalance mechanism through a pull exerted thereon through the adjustable hook rod 12. The raising of the pendulums 13 will serve to counterbalance the weight of a load within the capacity of the pendulum counterbalance mechanism. When the weight of the load placed on the platform 70 exceeds the capacity of the pendulum counterbalance mechanism, a portion of this weight may be offset by depositing one or more of the detachable counterpoise weights 27 onto the hanging counterpoise 25 carried by the scale beam 9 by moving the hand lever 33 and the weight depositing mechanism, or by sliding one or more of the poises 9$^b$ along the tare or capacity beams 9$^a$ carried by the scale beam, and the remaining portion of the weight of the load may be offset by the pendulum counterbalance mechanism. Also the pendulum counterbalance may be disconnected from the scale beam if desired and the several poises of the scale beam be utilized to offset the weight of the load on the platform 70 in the usual manner of beam scales.

While the embodiments herein illustrated disclose constructions well adapted to adequately fulfill the objects of the invention primarily stated, it will be understood that my invention is susceptible to modification, variation and change within the spirit and scope of the subjoined claims.

Having described my invention, I claim:

1. In a scale, beam scale mechanism, pendulum weighing mechanism, and a detachable link adjustable in length for connecting said mechanisms to operate the pendulum mechanism from the beam mechanism when desired.

2. In a scale, beam scale mechanism including a beam and poise slidable thereon, pendulum weighing mechanism, and connections between said mechanisms to operate the pendulum mechanism from the beam including a link having a member thereon adapted to be moved into and out of engagement with the beam, and means for releasably locking said member in position engaging the beam.

3. In a scale, beam scale mechanism including a beam and poise slidable thereon, pendulum weighing mechanism, and connections between said mechanisms to operate the pendulum mechanism from the beam including a link having a member pivotally mounted thereon and adapted to swing into and out of engagement with the beam.

4. In a scale, beam scale mechanism, pendulum weighing mechanism, and connections between said mechanisms to operate the pendulum mechanism from the beam including a link having a member pivotally mounted thereon and adapted to swing into and out of engagement with the beam, and a latch for releasably locking said swinging member in engagement with the beam.

5. In a scale, a scale beam, a counterpoise receiving pan carried thereby, a series of counterpoise weights suspended one from another above said pan, means for supporting the uppermost weight of the series, and manually-operated means for lowering the said supporting means to deposit said weights serially upon said pan.

6. In a scale, a scale beam, a counterpoise receiving pan carried thereby, a series of counterpoise weights suspended one from another above said pan, a lever supporting the uppermost weight of the series, and manually-operated means for lowering the said lever to deposit said weights serially upon said pan.

7. In a scale, a scale beam, a counterpoise receiving pan carried thereby, a series of counterpoise weights suspended one from another above said pan, a lever supporting the uppermost weight of the series, resilient means for normally maintaining the lever in raised position, and manually-operated means for lowering the said lever to deposit said weights serially upon said pan.

8. In a scale, a scale beam, a counterpoise receiving pan carried thereby, a series of counterpoise weights suspended above said pan, a lever from which the series of weights is suspended, resilient means for normally maintaining the lever in raised position including a coil spring arranged to be compressed as the lever is lowered, and manually-operated means for lowering the said lever to deposit said weights serially upon said pan.

9. In a scale, a scale beam, a counterpoise receiving pan carried thereby, a series of counterpoise weights suspended above said pan, a lever from which the series of weights is suspended, resilient means for normally maintaining the lever in raised position comprising a coil spring mounted to normally impinge against said lever at an angle thereto and arranged to be compressed as the lever is lowered, and manually-operated means for lowering the said lever to deposit said weights serially upon said pan.

10. In a scale, a scale beam, a counterpoise receiving pan carried thereby, a series of counterpoise weights suspended above said pan, a lever from which the series of weights is suspended, means for normally maintaining the lever in raised position, including an apertured crossbar pivoted on said lever, a rod pivoted on a fixed portion of the scale in a plane slightly below that of the fulcrum of said lever, a coil spring encircling said rod and impinging against the crossbar, the arrangement being such that as the lever is lowered from its normal raised position, the pivoted rod approaches a straight line position with relation to the fulcrum of the lever and the coil spring is compressed, and manually-operated means for lowering the said lever to deposit said weights serially upon said pan.

11. In a scale, a scale beam, a counterpoise receiving pan carried thereby, a series of counterpoise weights suspended one from another above said pan, means for supporting the uppermost weight of the series, manually-operated means for lowering the said supporting means to deposit said weights serially upon said pan, and means for indicating the weight counterbalancing capacity of the weights deposited upon the counterpoise pan.

12. In a scale, a scale beam, a counterpoise receiving pan carried thereby, a series of counterpoise weights suspended one from another above said pan, a lever supporting the uppermost weight of the series, manually-operated means for lowering the said lever to deposit said weights serially upon said pan, and means connected with said lever for indicating the weight counterbalancing capacity of the weights deposited upon the counterpoise pan.

13. In a scale, a scale beam, a counterpoise receiving pan carried thereby, a series of counterpoise weights suspended one from another above said pan, a lever supporting the uppermost weight of the series, manually-operated means for lowering the said lever to deposit said weights serially upon said pan, and means connected with said lever for indicating the weight counterbalancing capacity of the weights deposited upon the counterpoise pan, said means including an indicator and a slidable sleeve directly connected with the lever and adjustable to various positions on the indicator.

14. In a scale, a scale beam, a counterpoise receiving pan carried thereby, a series of counterpoise weights suspended one from another above said pan, a lever supporting the uppermost weight of the series, manually-operated means for lowering the said lever to deposit said weights serially upon said pan, and means connected with said lever for indicating the weight counterbalancing capacity of the weights deposited upon the counterpoise pan, said means including an arm carrying an indicating plate, and an adjustable sleeve on said arm connected with the lever.

15. In a scale, a scale beam, a counterpoise receiving pan carried thereby, a series of counterpoise weights suspended one from another above said pan, a lever supporting the uppermost weight of the series, manually-operated means for lowering the said lever to deposit said weights serially upon said pan, and means connected with said lever for indicating the weight counterbalancing capacity of the weights deposited upon the counterpoise pan, said means including a pivoted arm carrying an indicator plate and a sleeve slidable on said arm and adapted to be fixed thereon in various positions.

16. In a scale, a scale beam, a counterpoise receiving pan carried thereby, a series of counterpoise weights normally disconnected from the scale, means for depositing the weights serially upon said pan, and means actuated from the weight depositing means for indicating the counterbalancing capacity of the weights deposited upon the counterpoise pan, said means including an indicator, and an adjustable connector between the indicator and the weight depositing means.

17. In a scale, a scale beam, a counterpoise receiving pan carried thereby, a series of counterpoise weights normally disconnected from the scale, means for depositing the weights serially upon said pan, and means actuated from the weight depositing means for indicating the counterbalancing capacity of the weights deposited upon the counterpoise pan, said means including an indicator, an arm fixed thereto, and a sleeve adjustable on the arm and connected with the weight depositing means.

18. In a scale, a casing, a scale beam fulcrumed within the casing, a counterpoise receiving pan carried thereby, a post mounted in alignment with the fulcrum of the beam, a link pivotally connected to the post and counterpoise pan and forming a parallelogram with the scale beam, a series of counterpoise weights normally suspended above said pan, and means for depositing said weights serially upon said pan.

19. In a scale, a casing, a scale beam fulcrumed within the casing, a counterpoise receiving pan carried thereby, a post mounted in alignment with the fulcrum of the beam, a link pivotally connected to the post and counterpoise pan and forming a parallelogram with the scale beam, a series of counterpoise weights normally suspended above said pan, means for depositing said weights serially upon said pan, and guide means carried by the casing to guide said weights in their movements to and from the pan.

20. In a scale, a casing, a scale beam fulcrumed within the casing, a counterpoise receiving pan carried thereby, an adjustable post mounted in alignment with the fulcrum of the beam, a link pivotally connected to the post and counterpoise pan and forming a parallelogram with the scale beam, a series of counterpoise weights normally suspended above said pan and adapted to be lowered upon said pan, means for depositing said weights serially upon said pan, and guide means carried by the casing to guide said weights in their movements.

21. In a scale, a casing, a scale beam fulcrumed within the casing, a counterpoise receiving pan carried thereby, a post mounted in alignment with the fulcrum of the beam, a link pivotally connected to the post and counterpoise pan and forming a parallelogram with the scale beam, a series of counterpoise weights normally suspended one from another above said pan, means for depositing said weights serially upon said pan, and guide means carried by the casing to guide said weights in their movements, said guide means comprising slides mounted in the casing and a bracket slidable therein and engaging the uppermost of the series of weights.

22. In a scale, a casing, a scale beam, a counterpoise receiving pan carried thereby, a series of counterpoise weights normally suspended one from another above said pan, means for suspending said weights comprising a lever fulcrumed within the casing, links between the lever and the uppermost of said weights, means for normally maintaining the lever in raised position, and means for lowering said lever to serially deposit the weights upon said pan.

23. In a scale, a scale beam, a counterpoise receiving pan carried thereby, a series of counterpoise weights suspended one from another above said pan, each of said weights comprising a body portion having oppositely-disposed supporting arms, and slotted suspension lugs adapted to engage the supporting arms of the weight next above, and means for depositing said weights serially upon said pan.

24. In a scale, a scale beam, a counterpoise receiving pan carried thereby, a series of counterpoise weights suspended one from another above said pan, each of said weights comprising an apertured body portion encircling the stem of the counterpoise pan, oppositely-disposed supporting arms, and slotted suspension lugs adapted to engage the supporting arms of the weight next above, and means for depositing said weights serially upon said pan.

25. In a scale, a scale beam having a pivot, a clevis straddling said beam and resting upon said pivot, a counterpoise pan suspended from the clevis, and an upper weight-receiving pan supported upon the clevis above the scale beam.

26. In a scale, a scale beam having a pivot, a clevis straddling said beam and resting upon said pivot, a counterpoise pan suspended from the clevis, a series of counterpoise weights normally suspended above the counterpoise pan, a detachable weight-receiving upper pan supported upon said clevis, and means for depositing the series of weights on the counterpoise pan.

27. In a scale, a scale beam, a pendulum weighing mechanism normally connected therewith, and means for locking the scale beam and pendulum mechanism in inoperative position comprising a rock-shaft mounted adjacent the beam, a crank arm carried by said rock-shaft and adapted to be swung into locking engagement with the beam, means for rotating said rock-shaft and gravity-controlled means for holding said rock shaft in locked or unlocked position.

28. In a scale, a scale beam having a pivot, and means for adjusting said pivot longitudinally and vertically on said beam, comprising a disc rotatively mounted in the scale beam and having an eccentric aperture therethrough, a smaller disc mounted in the eccentric aperture and adapted to receive the pivot, and means for imparting rotative movement to said discs.

29. In scale, a scale beam having a pivot, and means for adjusting said pivot longitudinally and vertically on said beam, comprising a disc rotatively mounted in the scale beam and having an eccentric aperture therethrough, a smaller disc mounted in the eccentric aperture and adapted to receive the pivot, means for clamping the pivot in said small disc, and means for securing said discs in any angular position.

30. In a scale, the combintion with a lever having a pivot, a platform and a compensating rocking bearing interposed between the platform and pivot, comprising a saddle-block carrying a pivoted bearing resting upon the pivot, a pair of parallel links mounted to swing on the saddle-block, platform-supporting members fulcrumed on said links in planes at right angles to the plane of movement of the links, and legs depending from the platform having bifurcated portions straddling the platform-supporting members.

31. In a scale, the combination with a lever having a pivot, a platform and a compensating rocking bearing interposed between the platform and pivot, comprising a saddle-block provided with bifurcated members carrying a pivoted bearing resting upon the pivot, a pair of parallel links mounted to swing on the saddle-block, platform-supporting members fulcrumed on said links in planes at right angles to the plane of movement of the links, and legs depending from the platform having bifurcated portions straddling the platform-supporting members.

32. In a scale, in combination with a lever having pivots extending laterally from each side thereof, a saddle-block arranged to straddle said lever and provided with legs carrying pivoted bearings resting upon the pivot, a pair of parallel links mounted to swing on the saddle-block, platform supporting members fulcrumed on said links in planes at right angles to the plane of movement of the links, and legs depending from the platform having bifurcated portions straddling the platform-supporting members.

33. In a scale, in combination with a lever having pivots extending laterally from each side thereof, a saddle-block having legs arranged to straddle said lever and provided with bifurcated members carrying pivoted bearings resting upon the pivot, a pair of parallel links mounted to swing on the saddle-block, platform-supporting members fulcrumed on said links in planes at right angles to the plane of movement of the links, and legs depending from the platform having bifurcated portions straddling the platform-supporting members.

34. In a scale, the combination with a lever having a pivot, a frame, and a bearing for the pivot having a rounded lower surface resting upon the frame, said bearing being pivotally mounted upon the frame axially of the rounded surface.

35. In a scale, in combination with a lever having a pivot, a frame, a compensating fulcrum for the pivot comprising a bracket carrying bearings contacting with the pivot, said bracket being pivotally mounted upon the frame in line with said bearings.

36. In a scale, the combination with a lever having a pivot, a base having floor and side portions, and a fulcrum bearing for the pivot having a rounded lower surface resting upon the floor portion, said bearing being pivotally secured to the side portion of the base.

37. In a scale, in combination with a lever having a pivot, a frame, a compensating fulcrum for the pivot comprising a bracket carrying bearings pivotally mounted therein and contacting with the pivot, said bracket being pivotally mounted upon the frame in line with said bearings.

38. In a scale, in combination with a lever having a pivot extending laterally on each side thereof, a frame, a compensating fulcrum for the pivot comprising a bracket having bifurcated arms carrying pivoted bearings therein contacting with the pivot, said bracket being pivotally mounted upon the frame in line with said bearings.

39. In a scale, in combination, beam scale mechanism, including a lever having a graduated weighing beam secured thereto, a weighing poise slidable on said graduated weighing beam, pendulum weighing mechanism, indicating mechanism including a dial located above said weighing beam, and connections between said pendulum mechanism and said beam scale mechanism including a member connected to said pendulum mechanism and movable into and out of connection with said lever.

HALVOR O. HEM.

Witnesses:
CLARENCE H. HAPGOOD,
K. E. HAYES.